(12) United States Patent
Sankai

(10) Patent No.: US 12,502,298 B2
(45) Date of Patent: Dec. 23, 2025

(54) KNEE JOINT ORTHOTIC DEVICE MANUFACTURING APPARATUS AND KNEE JOINT ORTHOTIC DEVICE MANUFACTURING METHOD, AND KNEE JOINT TREATMENT SUPPORT APPARATUS AND KNEE JOINT TREATMENT SUPPORT METHOD

(71) Applicants: CYBERDYNE Inc., Tsukuba (JP); University of Tsukuba, Tsukuba (JP)

(72) Inventor: Yoshiyuki Sankai, Tsukuba (JP)

(73) Assignees: CYBERDYNE INC., Tsukuba (JP); UNIVERSITY OF TSUKUBA, Tsukuba (JP)

( * ) Notice: Subject to any disclaimer, the term of this patent is extended or adjusted under 35 U.S.C. 154(b) by 1023 days.

(21) Appl. No.: 17/570,616

(22) Filed: Jan. 7, 2022

(65) Prior Publication Data

US 2022/0125614 A1  Apr. 28, 2022

Related U.S. Application Data

(62) Division of application No. 16/333,559, filed as application No. PCT/JP2017/032352 on Sep. 7, 2017, now abandoned.

(30) Foreign Application Priority Data

Sep. 14, 2016  (JP) ................... 2016-179208

(51) Int. Cl.
*G06F 7/48* (2006.01)
*A61B 5/107* (2006.01)
(Continued)

(52) U.S. Cl.
CPC .......... *A61F 5/0123* (2013.01); *A61B 5/1075* (2013.01); *A61B 5/1077* (2013.01);
(Continued)

(58) Field of Classification Search
CPC ... A61B 5/1075; A61B 5/1077; A61B 5/1079; A61B 6/03; A61F 5/01; A61F 5/0123;
(Continued)

(56) References Cited

U.S. PATENT DOCUMENTS 5,344,390 A    9/1994  Motloch
9,221,177 B2 * 12/2015  Herr ..................... B25J 9/1694
(Continued)

FOREIGN PATENT DOCUMENTS

CN    105310811 A    2/2016
JP    2002-523182 A  7/2002
(Continued)

OTHER PUBLICATIONS

International Search Report and Written Opinion for related International Application No. PCT/JP2017/032352, mailed Oct. 24, 2017; English translation of ISR provided; 10 pages.
(Continued)

*Primary Examiner* — Nithya J. Moll
(74) *Attorney, Agent, or Firm* — Procopio, Cory, Hargreaves & Savitch LLP

(57) ABSTRACT

Noninvasive natural healing in daily life or regenerative cell treatment can be promoted. A knee joint model is constructed by three-dimensionally analyzing measurement data obtained by measuring an outline shape and internal space shape of a knee joint part of a subject; a transition state towards an orthotic direction for a symptom improvement of the knee joint part is simulated continuously or stepwisely with reference to the knee joint model; and an exoskeleton mold capable of continuously or stepwisely finely adjusting the knee joint part towards the orthotic direction is designed based on the transition state.

11 Claims, 4 Drawing Sheets

(51) Int. Cl.
*A61B 6/03* (2006.01)
*A61F 5/01* (2006.01)
*A61F 5/02* (2006.01)
*A61H 1/02* (2006.01)
*A61H 3/00* (2006.01)
*B29C 33/38* (2006.01)
*G06F 30/23* (2020.01)

(52) U.S. Cl.
CPC .............. *A61B 5/1079* (2013.01); *A61B 6/03* (2013.01); *A61F 5/01* (2013.01); *A61F 5/02* (2013.01); *A61H 1/024* (2013.01); *A61H 3/00* (2013.01); *B29C 33/3835* (2013.01); *G06F 30/23* (2020.01); *A61H 2003/007* (2013.01)

(58) Field of Classification Search
CPC ..... A61F 5/02; A61H 1/024; A61H 2003/007; A61H 3/00; G06F 30/23; B29C 33/3835; B25J 11/00
See application file for complete search history.

(56) References Cited

U.S. PATENT DOCUMENTS

| | | |
|---|---|---|
| 2002/0161472 A1 | 10/2002 | Oshitani et al. |
| 2004/0136583 A1 | 7/2004 | Harada et al. |
| 2005/0107726 A1 | 5/2005 | Oyen et al. |
| 2005/0209726 A1 | 9/2005 | Voit et al. |
| 2009/0093891 A1 | 4/2009 | Summit |
| 2009/0274350 A1 | 11/2009 | Pavlovskaia et al. |
| 2010/0198067 A1 | 8/2010 | Mahfouz et al. |
| 2010/0268135 A1 | 10/2010 | Summit et al. |
| 2011/0112808 A1* | 5/2011 | Anderson .............. G16H 50/50 703/2 |
| 2012/0234329 A1 | 9/2012 | Vancraen et al. |
| 2014/0324182 A1 | 10/2014 | Graumann et al. |
| 2015/0328016 A1 | 11/2015 | Summit et al. |
| 2016/0022472 A1 | 1/2016 | Gruenberg |
| 2016/0143800 A1 | 5/2016 | Tyung et al. |
| 2017/0000505 A1 | 1/2017 | Gordon et al. |
| 2019/0070010 A1 | 3/2019 | Mccombs |
| 2019/0201214 A1 | 7/2019 | Miller et al. |
| 2019/0209357 A1 | 7/2019 | Sankai |
| 2020/0315803 A1 | 10/2020 | Zille |

FOREIGN PATENT DOCUMENTS

| | | |
|---|---|---|
| JP | 3888975 B2 | 12/2006 |
| JP | 2011-519605 A | 7/2011 |
| JP | 2012-508075 A | 4/2012 |
| JP | 2013-504351 A | 2/2013 |
| JP | 2013-530757 A | 8/2013 |
| JP | 5723788 B2 | 4/2015 |
| JP | 2016-509906 A | 4/2016 |
| JP | 2016-097300 A | 5/2016 |
| WO | 2012/086202 A1 | 6/2012 |
| WO | 2014/091922 A1 | 6/2014 |

OTHER PUBLICATIONS

Extended European Search Report for related EP App No. 17850801.6 dated Aug. 21, 2020, 9 pgs.

Notice of Reasons for Refusal for related JP App No. 2018-539673 dated Feb. 25, 2020, 9 pages.

* cited by examiner

KNEE JOINT ORTHOTIC DEVICE MANUFACTURING APPARATUS AND KNEE JOINT ORTHOTIC DEVICE MANUFACTURING METHOD, AND KNEE JOINT TREATMENT SUPPORT APPARATUS AND KNEE JOINT TREATMENT SUPPORT METHOD

CROSS-REFERENCE TO RELATED APPLICATIONS

This application is divisional of U.S. application Ser. No. 16/333,559, filed Mar. 14, 2019, which is a U.S. National Stage entry of PCT Application No: PCT/JP2017/032352 filed Sep. 7, 2017, which claims priority to Japanese Patent Application No. 2016-179208, filed Sep. 14, 2016, the contents of which are incorporated herein by reference.

TECHNICAL FIELD

The present invention relates to a knee joint orthotic device manufacturing apparatus and knee joint orthotic device manufacturing method and a knee joint treatment support apparatus and knee joint treatment support method. Particularly, the invention is suited for use in an apparatus and method for designing a wearable joint orthotic device for gonarthrosis patients.

BACKGROUND ART

In recent years, as our country has entered the aging society, degenerative diseases based on changes caused by aging has been steadily increasing and osteoarthrosis has become one of the most prevalent diseases among orthopedic diseases. Gonarthrosis among those diseases is caused mainly by wear of knee cartilage along with aging and brings about symptoms such as aching pain, inflammation, and contracture of a knee joint, so that deformation of the knee joint gradually worsens and will result in a gait disorder and, therefore, the QOL (Quality of Life) will degrade significantly.

It is said that correcting deformities is effective in order to slow down the progression of, or improve, the gonarthrosis; however, it may not often result in sufficient self-healing and surgery may be eventually performed.

Meanwhile, surgery such as high tibial osteotomy and artificial joint replacement may cause high risks attributable to complications and heavy mental and physical burdens, so that there is a demand for development of a new method which does not involve the invasion of to a body.

Conventionally, there is provided a knee joint diagnosis system for automatically judging whether any damage exists or not, the type (diagnosis) of the damage, and the degree of influences by the damage on ligaments, muscles, bones, meniscuses, and cartilages by collecting and analyzing kinematical data specific to a patient's knee joint and collecting and analyzing patterns and space distribution of sounds (vibrations) caused by movements of the patient's knee joint (see PTL 1).

This knee joint diagnosis system is designed to automatically output information about the existence of any damage to the knee joint, the type of the damage, and severity of the damage by causing a learning neural network to analyze motor learning data and sound data generated based on criteria specific to the patient.

CITATION LIST

Patent Literature

PTL 1: Japanese Patent Registration No. 5723788

SUMMARY OF THE INVENTION

Problems to be Solved by the Invention

However, the above-described knee joint diagnosis system can only diagnose the type and degree of the damage to the knee joint at present by using ultrasonic waves and does not continue monitoring the patient's knee joint treatment status in consideration of the patient's own weight on a real-time basis.

Also, nothing is mentioned about how the patient will be treated while correcting the knee joint after recognizing the damage condition of the knee joint for the purpose of the diagnosis. It is desirable that consideration should be given to provide a treatment method by natural healing to a patient who suffers from mild gonarthrosis and also provide a regenerative medical method by means of injection of stem cells to a patient who suffers from severe gonarthrosis.

The present invention was devised in consideration of the above-described circumstances and aims at proposing a knee joint orthotic device manufacturing apparatus and knee joint orthotic device manufacturing method, and a wearable-type knee joint treatment support apparatus and knee joint treatment support method that are capable of promoting noninvasive natural healing in daily life or regenerative cell treatment.

Means to Solve the Problems

In order to solve the above-described problems, the present invention is designed to include: a model construction unit that constructs a knee joint model by three-dimensionally analyzing measurement data obtained by measuring an outline shape and internal space shape of a knee joint part of a subject; a transition state prediction unit that continuously or stepwisely simulates a transition state towards an orthotic direction for a symptom improvement of the knee joint part so that a load imposed by the subject's own weight on the knee joint part causes a contact pressure force to be dispersed between a femur tip and a tibia tip with reference to the knee joint model by the model construction unit; and a mold designing unit that designs an exoskeleton mold capable of continuously or stepwisely finely adjusting the knee joint part towards the orthotic direction on the basis of the transition state by the transition state prediction unit.

Accordingly, the knee joint orthotic device manufacturing apparatus can design the exoskeleton mold capable of continuously or stepwisely finely adjusting the transition state towards the orthotic direction for the symptom improvement of the subject's knee joint part. As a result, when the patient wearing the exoskeleton mold suffers from mild gonarthrosis, noninvasive natural healing in daily life can be achieved; and in a case of severe gonarthrosis, treatment can be given while regenerating cartilage cells by injecting, for example, stem cells into the internal space in the knee joint part from outside. Particularly, since the internal space in the knee joint part is always maintained with a constant pressure, the internal space in the knee joint part can be used to create a stable environment suited for the cell regeneration for the patient with the severe gonarthrosis.

Furthermore, according to the present invention, the transition state prediction unit simulates the transition state towards the orthotic direction of the knee joint model so that the outline shape and the internal space shape of the knee joint part changes their shapes smoothly from a current start state to the wearer's ideal healthy state.

As a result, when the patient wearing the knee joint orthotic device suffers from the mild gonarthrosis, the noninvasive natural healing in daily life can be achieved simply by continuously or stepwisely finely adjusting the knee joint part towards the orthotic direction.

Furthermore, the exoskeleton mold designed by the mold designing unit is composed of a wearable-type knee joint orthotic device including: a thigh fixing unit closely attached and fastened to a lower thigh part of the subject; a shin fixing unit secured to an upper shin part of the subject; a hinge unit that couples the thigh fixing unit and the shin fixing unit together and pivotally supports the knee joint part of the subject in a manner freely rotatable in a bending direction and an extending direction; and an adjustment mechanism capable of adjusting an rotation angle of the hinge unit.

As a result, the hinge unit coupled to the thigh fixing unit and the shin fixing unit of the knee joint orthotic device rotates along the bending direction or the extending direction the knee joint, so that if the adjustment mechanism is used to continuously or stepwisely finely adjust the hinge unit towards the orthotic direction, the gonarthrosis can be treated while the subject spends their daily life, for example, by performing a walking motion in a state of wearing the knee joint orthotic device.

Furthermore, the present invention is designed to include: a pressure sensing unit that is attached to the knee joint orthotic device manufactured by the knee joint orthotic device manufacturing apparatus stated above and detects a pressure applied to an external force acting point of the knee joint part of the subject wearing the knee joint orthotic device; and a state-maintaining detection unit that is attached to the knee joint orthotic device manufactured by the knee joint orthotic device manufacturing apparatus stated above and detects an adjustment amount of the knee joint orthotic device so that the transition state towards the orthotic direction of the knee joint part will be maintained within a specified reference range on the basis of a result of the detection by the pressure sensing unit.

As a result, the subject's knee joint part can be safely caused to make the transition to the orthotic direction by adjusting the knee joint orthotic device so that the pressure applied to the subject's knee joint part will be always maintained within the stable reference range.

Furthermore, the present invention is designed to include: a pressure sensing unit that is attached to each of the thigh fixing unit and the shin fixing unit of the subject wearing the knee joint orthotic device manufactured by the aforementioned knee joint orthotic device manufacturing apparatus and detects a pressure applied to an external force acting point of the knee joint part; and a state-maintaining detection unit that detects an adjustment amount of the adjustment mechanism so that the transition state towards the orthotic direction of the knee joint part will be maintained within a specified reference range on the basis of a result of the detection by the pressure sensing unit.

As a result, the subject's knee joint part can be safely caused to make the transition to the orthotic direction by adjusting the adjustment mechanism so that the pressure applied to the subject's knee joint part will be always maintained within the stable reference range.

Furthermore, the adjustment mechanism includes an actuator drive mechanism and is designed to automatically adjust the rotation angle of the hinge unit according to the adjustment amount detected by the state-maintaining adjustment unit. As a result, there is the advantage that the knee joint part can automatically make the transition to the orthotic direction without requiring the subject to do anything by themselves, so that the treatment will be given naturally while the subject spends the daily life.

Advantageous Effects of the Invention

The present invention makes it possible to implement a knee joint orthotic device manufacturing apparatus and knee joint orthotic device manufacturing method, and wearable-type knee joint treatment support apparatus and knee joint treatment support method that: can achieve noninvasive natural healing in daily life when a subject wearing a knee joint orthotic device suffers from mild gonarthrosis; and can also enable treatment to be given while culturing cartilage cells in an internal space of a knee joint part when the subject suffers from severe gonarthrosis.

DESCRIPTION OF EMBODIMENTS

An embodiment of the present invention will be explained below in detail with reference to the drawings.

Figure 1:
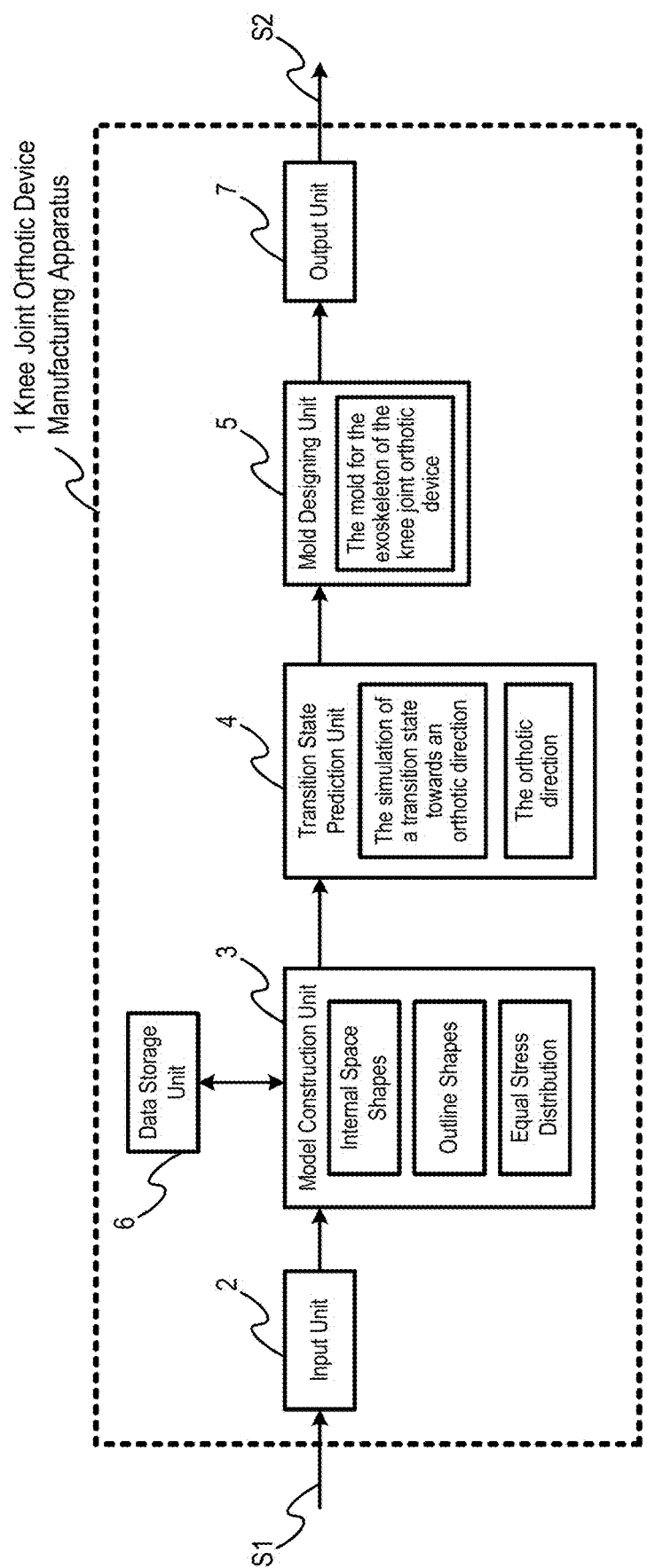
FIG. 1 is a block diagram illustrating the configuration of a knee joint orthotic device manufacturing apparatus according to an embodiment of the present invention.

(1) Configuration of Knee Joint Orthotic Device Manufacturing Apparatus According to the Present Invention FIG. 1 illustrates a knee joint orthotic device manufacturing apparatus 1 according to this embodiment and the knee joint orthotic device manufacturing apparatus 1 can be constructed by installing a knee joint orthotic device designing program, to which the present invention is applied, to a computer such as a so-called PC (Personal Computer).

First of all, it is necessary to acquire three-dimensional measurement data by measuring an outline shape and internal space shape of a subject's knee joint part. Specifically speaking, the outline shape of the knee joint part is measured by laser scanning with a 3-D laser scanner (which is not illustrated in the drawing) and the internal space shape of the knee joint part is measured by Computed Tomography (CT) or Magnetic Resonance Imaging (MRI).

The knee joint orthotic device manufacturing apparatus 1 includes, as illustrated in FIG. 1, an input unit 2, a model construction unit 3, a transition state prediction unit 4, a mold designing unit 5, a data storage unit 6, and an output unit 7. The input unit 2 is used when an operator who uses a system in the apparatus to perform input operations on the system; and the input unit 2 serves a role as a communication interface to receive data transmitted from, for example, external equipment such as a 3-D laser scanner via the network.

The input unit 2 receives three-dimensional measurement data S1, which represents the measured outline shape and internal space shape of the subject's knee joint part, and transmits the three-dimensional measurement data S1 to the model construction unit 3.

The model construction unit 3 constructs a knee joint model which simulatively reproduces the details of the outline shape and the internal space shape of the knee joint part in a computer by, for example, three-dimensionally analyzing the three-dimensional measurement data S1 using a three-dimensional Finite Element Method (FEM).

Furthermore, the model construction unit 3 performs stress analysis with respect to the internal space shape of the knee joint part at the time of the three-dimensional analysis. Specifically speaking, after dividing the internal space shape of the knee joint part into meshes, the model construction unit 3: produces a rigidity matrix which is determined based on Young's modulus and Poisson's ratio specific to designated materials such as bones and cartilages with respect to each mesh; and generates a weight vector applied to a site surface under designated border conditions.

Subsequently, the model construction unit 3 calculates a stress vector accumulated at each element based on the weight vector and a displacement vector of each element obtained by solving the rigidity matrix. The model construction unit 3 constructs the knee joint model in which a stress distribution is reflected in the internal space of the knee joint part by generating contour lines of the stress distribution by connecting equal points with reference to the stress vector.

The data storage unit 6 stores necessary data (physical properties such as Young's modulus and Poisson's ratio specific to materials such as bones and cartilages) for the stress analysis by the model construction unit 3 in advance and such data is read by the model construction unit 3 as the need arises.

The transition state prediction unit 4 continuously or stepwisely simulates the transition state towards the orthotic direction for the symptom improvement of the knee joint part with reference to the knee joint model by the model construction unit 3. Specifically speaking, the transition state prediction unit 4 recalculates the displacement vector and the stress vector so that the load imposed by the subject's own weight on the knee joint part will cause a contact pressure force to be dispersed between a femur tip and a tibia tip, that is, concentrated stresses will be dispersed, based on the stress distribution in the internal space of the knee joint part with respect to the knee joint model obtained by the model construction unit 3.

The transition state prediction unit 4 continuously or stepwisely simulates the transition state towards the orthotic direction of the knee joint model by linking displacement vectors and stress vectors before and after the recalculation together in chronological order.

The mold designing unit 5 designs an exoskeleton mold capable of continuously or stepwisely finely adjusting the knee joint part towards the orthotic direction on the basis of the transition state by the transition state prediction unit 4. Specifically speaking, the mold designing unit 5: generates graphic data which draw a contour diagram of the stress distribution based on coordinate values of each mesh and the stress vectors as described above on the basis of the chronological displacement vectors and stress vectors according to the transition state by the transition state prediction unit 4; and then transmits the graphic data to the output unit.

The output unit 7 is a circuit which outputs the designing result of the exoskeleton mold to the operator of the system within the apparatus, is composed of a so-called display or the like, and serves a role as a communication interface to transmit design data S2 which represent the designing result to, for example, the external equipment via the network.

Accordingly, the knee joint orthotic device manufacturing apparatus 1 can design the exoskeleton mold capable of continuously or stepwisely finely adjusting the transition state towards the orthotic direction for the symptom improvement of the subject's knee joint part. Particularly, since the internal space of the knee joint part is always retained with a constant pressure, the internal space in the knee joint part can be used to create a stable environment suited for the cell regeneration for the patient with the severe gonarthrosis.

(2) Configuration of Wearable-Type Knee Joint Orthotic Device According to the Present Invention Subsequently, a wearable-type knee joint orthotic device is manufactured through a manufacturing process by, for example, a 3-D printer or die machining based on the exoskeleton mold designed by the aforementioned knee joint orthotic device manufacturing apparatus 1. In fact, whether the knee joint orthotic device is properly attached to the subject's knee joint part or not is checked by measuring changes in the knee joint model before and after the attachment by using CT.

(2-1) Manual-Type Knee Joint Treatment Support Apparatus

Figure 2:
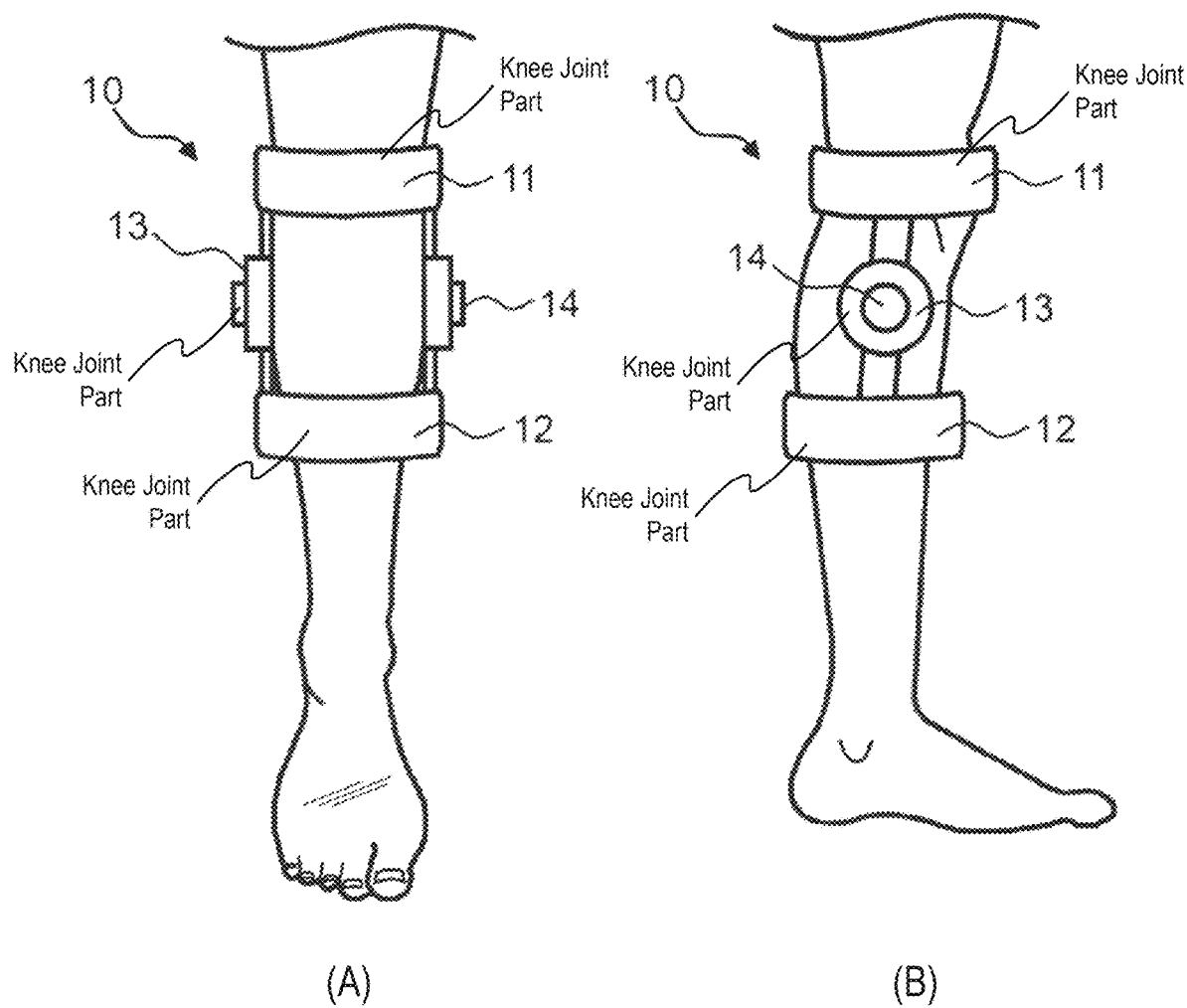
FIG. 2 is schematic diagrams illustrating an appearance configuration of a manual-type knee joint orthotic device according to an embodiment of the invention.

For example, as illustrated in FIG. 2A and FIG. 2B, the wearable-type knee joint orthotic device 10 includes: a thigh fixing unit 11 closely attached and fastened to a lower thigh part of the subject; a shin fixing unit 12 secured to an upper shin part of the subject; a hinge unit 13 that couples the thigh fixing unit 11 and the shin fixing unit 12 together and pivotally supports the knee joint part of the subject in a manner freely rotatable in a bending direction and an extending direction; and an adjustment mechanism 14 capable of adjusting an rotation angle of the hinge unit 13.

Specifically speaking, one end of the hinge unit 13 which is highly rigid is secured to the thigh fixing unit 11 and its other end is secured to the shin fixing unit 12, so that the adjustment mechanism 14 is designed to perform fine-level adjustments of the rotation angle of the hinge unit 13 around its rotation axis.

This adjustment mechanism 14 includes a lock mechanism for engaging the hinge unit 13 clockwise and counterclockwise, respectively, at desired angles around its rotation axis according to an external operation and an unlock mechanism for releasing the engaged state although they are not illustrated in the drawing.

As a result, the hinge unit 13 which is coupled to the thigh fixing unit 11 and the shin fixing unit 12 of the knee joint orthotic device 10 rotates along with the bending direction or the extending direction of the knee joint, so that if the hinge unit 13 is locked while continuously or stepwisely finely adjusting its rotation angle towards the orthotic direction by using the adjustment mechanism 14, the gonarthrosis can be treated while the subject spends their daily life, for example, performing the walking motion in the state of wearing the knee joint orthotic device 10.

(2-2) Automatic-Type Knee Joint Treatment Support Apparatus

Figure 3:
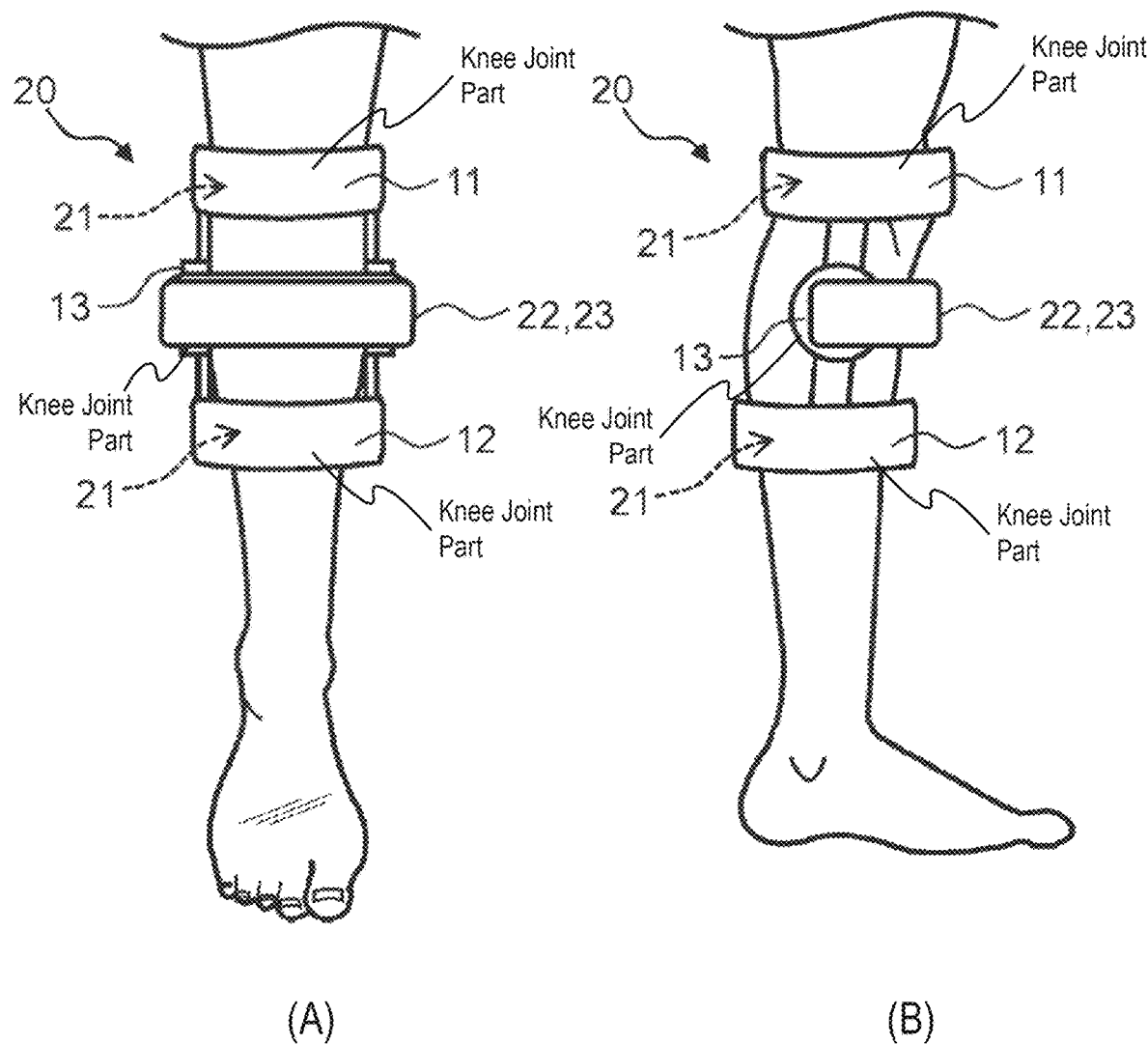
FIG. 3 is schematic diagrams illustrating an appearance configuration of an automatic-type knee joint orthotic device according to the embodiment of the invention.

Referring to FIG. 3A and FIG. 3B in which the same reference numerals as those in FIG. 2A and FIG. 2B are assigned to parts corresponding to those in FIG. 2A and FIG. 2B, a wearable-type knee joint orthotic device 20 includes a pressure sensor (pressure sensing unit) 21 which is attached thereto and detects a pressure applied to an external force acting point of the knee joint part of the subject wearing this. As an example of the pressure sensor 21, a variety of piezoelectric-crystal elements such as an MEMS pressure sensor, a capacitance-type pressure sensor, and a semiconductor-type pressure sensor may be applied.

The MEMS (Micro Electro Mechanical Systems) pressure sensor is a sensor that measures deformities of a cantilever as resistance changes as the cantilever changes its shape due to the difference between pressures imposed on both sides of the cantilever part.

Moreover, the capacitance-type pressure sensor is a sensor that forms a capacitor by placing a fixed electrode of glass and a movable electrode of silicon opposite to each other and converts changes in electrostatic capacity, which is generated by deformation of the movable electrode by a force (pressure) from outside, into an electric signal.

Furthermore, the semiconductor-type pressure sensor is a sensor that has a semiconductor strain gauge formed on a surface of a diaphragm and converts changes in electric resistance by piezoresistance effects, which are caused as the shape of the diaphragm is changed by a force (pressure) from outside, into an electric signal.

The knee joint orthotic device 20 includes a state-maintaining detection unit 22 which detects an adjustment amount of the knee joint orthotic device 20 so that the transition state towards the orthotic direction of the knee joint part will be maintained within a specified reference range based on the detection result of the pressure sensor 21.

This state-maintaining detection unit 22 detects the adjustment amount so that the transition state towards the orthotic direction will be always maintained within the specified reference range by returning any displacement to the orthotic direction when the displacement is caused by the external pressure in a direction different from the orthotic direction of the knee joint part.

Actually, with the knee joint treatment support apparatus according to the present invention, the aforementioned pressure sensor 21 is attached to each inner surface of the thigh fixing unit 11 and the shin fixing unit 12 of the subject wearing the knee joint orthotic device 20 so as to detect the pressure applied to the external force acting point of the knee joint part.

Then, the state-maintaining detection unit 22 calculates a displacement amount relative to the orthotic direction by comparing a pressure detection result on the inner surfaces of the thigh fixing unit 11 and the shin fixing unit 12 with a specified reference value.

Subsequently, the state-maintaining detection unit 22 detects an adjustment amount of the adjustment mechanism 23 for adjusting the rotation angle of the hinge unit 13 so that the transition state towards the orthotic direction of the knee joint part will be maintained within a specified reference range on the basis of the displacement amount relative to this orthotic direction.

The adjustment mechanism 23 according to the present invention includes an actuator drive mechanism and is designed to automatically adjust the rotation angle of the hinge unit 13 in accordance with the adjustment amount detected by the state-maintaining detection unit 22. There is the advantage that the knee joint part is caused to automatically make the transition to the orthotic direction without requiring the subject to do anything by themselves, so that the treatment will be given naturally while the subject spends the daily life.

(3) Motions According to this Embodiment

Figure 4:
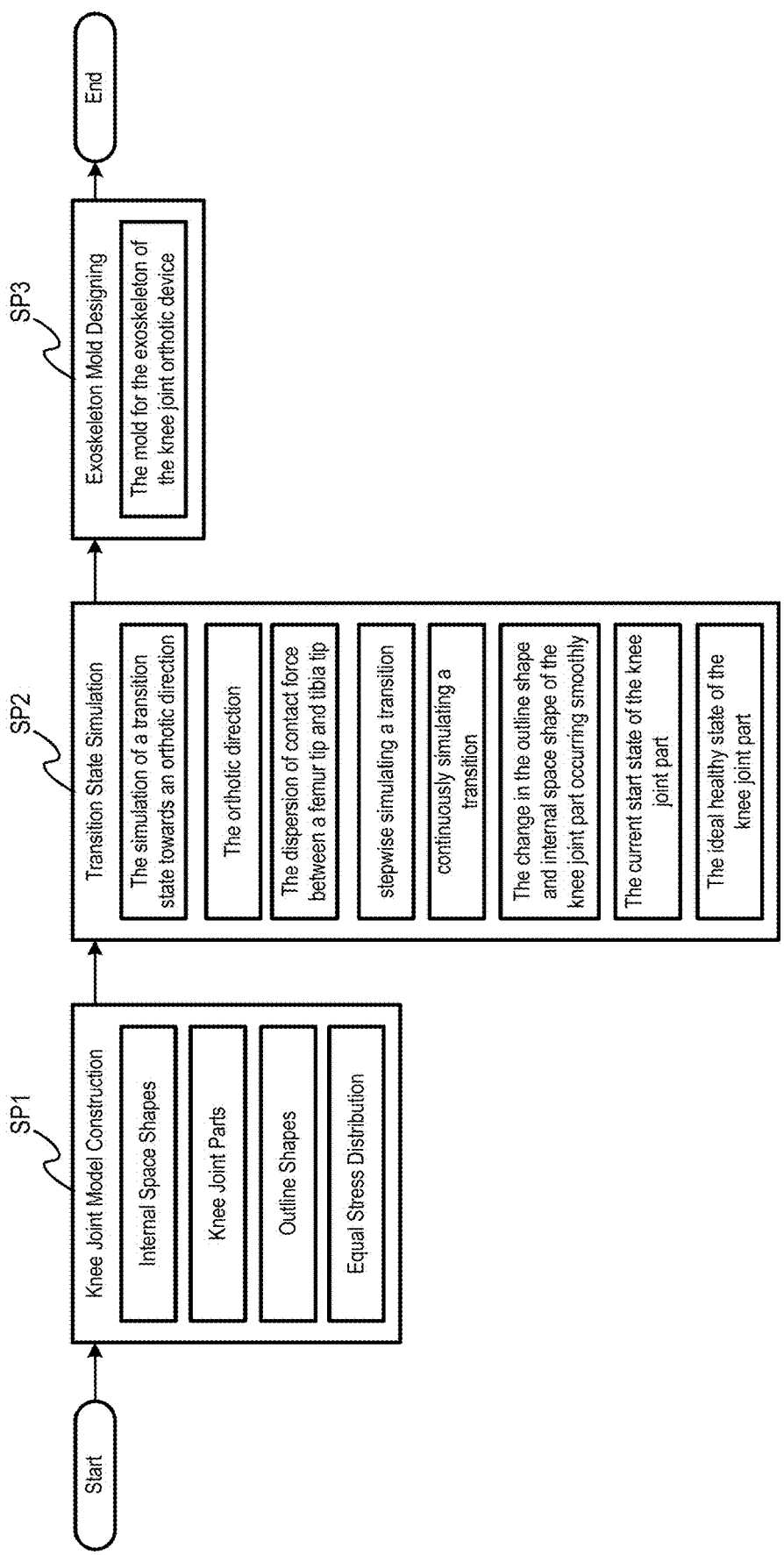
FIG. 4 is a flowchart illustrating a processing sequence for designing the knee joint orthotic device by the knee joint orthotic device manufacturing apparatus according to the embodiment.

The knee joint orthotic device manufacturing apparatus 1 as described above: constructs the knee joint model by three-dimensionally analyzing the measurement data obtained by measuring the outline shape and the internal space shape of the subject's knee joint part as illustrated in the design processing sequence in FIG. 4 (step SP1); and then continuously or stepwisely simulates the transition state towards the orthotic direction for the symptom improvement of the knee joint part so that the load imposed by the subject's own weight on the knee joint part will cause the contact pressure force to be dispersed between the femur tip and the tibia tip with reference to the knee joint model (step SP2).

Subsequently, the knee joint orthotic device manufacturing apparatus 1 designs the exoskeleton mold capable of continuously or stepwisely finely adjusting the knee joint part towards the orthotic direction on the basis of the simulated transition state (step SP3). When the patient wearing this exoskeleton mold suffers from the mild gonarthrosis, the noninvasive natural healing in daily life can be achieved; and in the case of the severe gonarthrosis, treatment can be given while injecting, for example, the stem cells into the internal space of the knee joint part from outside and causing regeneration of the cartilage cells.

Accordingly, the internal space of the knee joint part is always retained with a constant pressure and, therefore, the internal space of the knee joint part can be used to create a stable environment suited for the cell regeneration for the patient who suffers from the severe gonarthrosis.

Then, when the subject wears the knee joint orthotic device 10, 20 manufactured by the knee joint orthotic device manufacturing apparatus 1, the pressure applied to the external force acting point to the subject's knee joint part is detected while the adjustment amount of the knee joint orthotic device 10, 20 is detected so that the transition state towards the orthotic direction of the knee joint part will be maintained within the specified reference range based on the above detection result.

As a result, the subject's knee joint part can be safely caused to make the transition to the orthotic direction by adjusting the knee joint orthotic device 10, 20 manually or automatically so that the pressure applied to the subject's knee joint part will be maintained within the stable reference range.

(4) Advantageous Effects of this Embodiment

If the subject wears the knee joint orthotic device 10, 20 manufactured by the knee joint orthotic device manufacturing apparatus 1 as described above, the environment of the internal space of the knee joint part can be used to create the safe environment suited for the cell regeneration by simulating the transition state towards the orthotic direction of the knee joint model so that the load imposed on the knee joint part will cause the contact pressure force to be dispersed between the femur tip and the tibia tip without causing biased pressure concentration. As a result, the self-healing can be promoted when the subject suffers from the mild gonarthrosis; and in the case of the severe gonarthrosis, the treatment can be given while implementing regenerative therapy by means of injection of, for example, the stem cells.

Specifically speaking, the wearable-type knee joint treatment support apparatus can be constructed as a non-conventional new system which can use the subject's own knee space in a diseased state as a cell culturing system. Surgery has been the only conventional treatment to correct severe deformities attributable to the gonarthrosis; however, the above-described system is a system which can use the in vivo knee environment as a cell nurturing promotion environment like as in present invention and be utilized noninvasively, so that it can be expected that the system will be deployed as a new treatment method in the relevant field and this system can be an effective treatment for the severe gonarthrosis to which it has been impossible to apply the surgery.

(5) Other Embodiments

Incidentally, the aforementioned embodiment has described the case where the knee joint orthotic device manufacturing apparatus 1 is composed of the computer as illustrated in FIG. 1; however, the present invention is not limited to this example and a measurement means for measuring the outline shape and the internal space shape of the subject's knee joint part and a manufacturing means such as a 3-D printer or a die machining device for manufacturing an actual knee joint orthotic device from the exoskeleton mold designed by the mold designing unit may be coupled to a computer or an integrated apparatus may be configured of all the above-mentioned elements.

Furthermore, the aforementioned embodiment has described the case where the transition state prediction unit 4 (FIG. 1) simulates the transition state towards the orthotic direction of the knee joint model so that the concentrated pressure in the internal space of the knee joint part will be dispersed by means of the stress analysis; however, the present invention is not limited to this example and, in short, various methods such as deformation transition with less biased load based on the stress analysis may be applied as long as the internal space of the knee joint part can be always maintained with the constant pressure and the stable environment suited for the cell regeneration can be created.

For example, the transition state prediction unit 4 may simulate the transition state towards the orthotic direction of the knee joint model so that the outline shape and the internal space shape of the knee joint part will change their shapes (i.e., morph) smoothly from the current start state to the wearer's ideal healthy state.

As a result, when the patient wearing the knee joint orthotic device suffers from the mild gonarthrosis, the noninvasive natural healing in daily life can be achieved simply by continuously or stepwisely finely adjusting the knee joint part towards the orthotic direction.

Furthermore, in addition to the aforementioned embodiment, regarding the knee joint orthotic device 20 of the automatic-type knee joint treatment support apparatus, an impact sensor or an acceleration sensor may be further attached to the hinge unit 13 and the state-maintaining detection unit 22 may judge whether the position of the knee joint orthotic device 20 is deviated relative to the subject's knee joint part or not, while measuring the state of the subject when walking. Furthermore, a temperature sensor may be provided on the inner surfaces of the thigh fixing unit 11 and the shin fixing unit 12 to judge whether the internal space of the knee joint part is suited for the cell culturing environment or not. It is desirable that there should be provided a notification unit (which is not illustrated in the drawing) for notifying the subject of the judgment result by the state-maintaining detection unit 22 on a real-time basis the subject. As a result, the subject can recognize and deal with any inconveniences of the current treatment state on a real-time basis.

REFERENCE SIGNS LIST

1: knee joint orthotic device manufacturing apparatus
2: input unit
3: model construction unit
4: transition state prediction unit
5: mold designing unit
6: data storage unit
7: output unit
10, 20: knee joint orthotic device
11: thigh fixing unit
12: shin fixing unit
13: hinge unit
14, 23: adjustment mechanism
21: pressure sensor
22: state-maintaining detection unit

The invention claimed is:

1. A knee joint orthotic mold designing apparatus comprising:
a data storage device;
a network communication device;
a computer processor configured to:
construct a digital knee joint model by three-dimensionally analyzing measurement data obtained by measuring an outline shape using laser scanning and internal anatomical structure shape using Computed Tomography (CT) or Magnetic Resonance Imaging (MRI) of a knee joint part of a subject;
perform stress analysis with respect to the internal anatomical structure shape of the knee joint part, wherein performing the stress analysis includes: dividing the internal anatomical structure shape into meshes, producing a rigidity matrix based on Young's modulus and Poisson's ratio specific to designated materials with respect to each mesh, generating a weight vector applied to a site surface under designated border conditions, calculating a stress vector accumulated at each element based on the weight vector and a displacement vector of each element obtained by solving the rigidity matrix, and construct the digital knee joint model in which an equal stress distribution is reflected in the internal anatomical structure shape of the knee joint part by generating contour lines of the stress distribution by connecting equal points with reference to the stress vector;
predict a transition state by continuously or step wisely simulating a transition state towards an orthotic direction for a symptom improvement of the knee joint part by recalculating the displacement vector and the stress vector so that a load imposed by a weight of the subject on the knee joint part causes a contact pressure force to be dispersed between a femur tip and a tibia tip to disperse concentrated stresses with reference to the constructed digital knee joint model; and
design an exoskeleton mold by continuously or step wisely finely adjusting the knee joint part towards the orthotic direction on a basis of the predicted transition state by generating graphic data drawing a contour diagram of stress distribution based on coordinate values of each mesh and the stress vectors and always retaining the internal anatomical structure shape of the knee joint part with a constant pressure to create a stable environment suited for cell regeneration, wherein the network communication device is configured to transmit design data representing the designed exoskeleton mold to external equipment for manufacturing the knee joint orthotic device.

2. The knee joint orthotic mold designing apparatus according to claim 1, wherein the computer processor predicts the transition state by further simulating the transition state towards the orthotic direction of the constructed digital knee joint model so that the outline shape and the internal shape of the knee joint part changes their shapes from a current start state to the subject's ideal healthy state.

3. The knee joint orthotic mold designing apparatus according to claim 1, wherein the design data representing the designed exoskeleton mold includes data representing a designed wearable-type knee joint orthotic device, the data representing the designed wearable-type knee joint orthotic device includes data representing:

a thigh fixing unit configured to be closely attached and fastened to a lower thigh part of the subject;

a shin fixing unit configured to be secured to an upper shin part of the subject;

a hinge unit comprising a rigid member with one end secured to the thigh fixing unit and its other end secured to the shin fixing unit that couples the thigh fixing unit and the shin fixing unit together and pivotally supports the knee joint part of the subject in a manner freely rotatable in a bending direction and an extending direction; and an adjustment mechanism including a lock mechanism for engaging the hinge unit clockwise and counterclockwise, respectively, at desired angles around its rotation axis according to an external operation and an unlock mechanism for releasing an engaged state capable of adjusting a rotation angle of the hinge unit.

4. A knee joint orthotic mold designing method comprising:

constructing, on a processor, a digital knee joint model by three-dimensionally analyzing measurement data obtained by measuring an outline shape using laser scanning and internal anatomical structure shape using Computed Tomography (CT) or Magnetic Resonance Imaging (MRI) of a knee joint part of a subject;

performing stress analysis with respect to the internal anatomical structure shape of the knee joint part, wherein performing the stress analysis includes: dividing the internal anatomical structure shape into meshes, producing a rigidity matrix based on Young's modulus and Poisson's ratio specific to designated materials with respect to each mesh, generating a weight vector applied to a site surface under designated border conditions, calculating a stress vector accumulated at each element based on the weight vector and a displacement vector of each element obtained by solving the rigidity matrix, and constructing the digital knee joint model in which an equal stress distribution is reflected in the internal anatomical structure shape of the knee joint part by generating contour lines of the stress distribution by connecting equal points with reference to the stress vector;

predicting, by the processor, a transition state by continuously or step wisely simulating a transition state towards an orthotic direction for a symptom improvement of the knee joint part by recalculating the displacement vector and the stress vector so that a load imposed by a weight of the subject on the knee joint part causes a contact pressure force to be dispersed between a femur tip and a tibia tip to disperse concentrated stresses with reference to the constructed digital knee joint model;

designing, by the processor, an exoskeleton mold by continuously or step wisely finely adjusting the knee joint part towards the orthotic direction on a basis of the predicted transition state by generating graphic data drawing a contour diagram of stress distribution based on coordinate values of each mesh and the stress vectors and always retaining the internal anatomical structure shape of the knee joint part with a constant pressure to create a stable environment suited for cell regeneration; and transmitting the design data representing the designed exoskeleton mold to external equipment for manufacturing the knee joint orthotic mold.

5. The knee joint orthotic model designing method according to claim 4, wherein the predicting the transition state comprises further simulating the transition state towards the orthotic direction of the constructed knee joint model so that the outline shape and the internal anatomical structure shape of the knee joint part changes their shapes smoothly from a current start state to the subject's ideal healthy state.

6. The knee joint orthotic model designing method according to claim 4, wherein the design data representing the designed exoskeleton mold includes data representing a designed wearable-type knee joint orthotic device, the data representing the designed wearable-type knee joint orthotic device includes data representing:

a thigh fixing unit configured to be closely attached and fastened to a lower thigh part of the subject;

a shin fixing unit configured to be secured to an upper shin part of the subject;

a hinge unit comprising a rigid member with one end secured to the thigh fixing unit and its other end secured to the shin fixing unit that couples the thigh fixing unit and the shin fixing unit together and pivotally supports the knee joint part of the subject in a manner freely rotatable in a bending direction and an extending direction; and an adjustment mechanism including a lock mechanism for engaging the hinge unit clockwise and counterclockwise, respectively, at desired angles around its rotation axis according to an external operation and an unlock mechanism for releasing an engaged state capable of adjusting a rotation angle of the hinge unit.

7. A knee joint orthotic device comprising:

an exoskeleton mold designed by a process comprising:

constructing, on a processor, a digital knee joint model by three-dimensionally analyzing measurement data obtained by measuring an outline shape using laser scanning and internal anatomical structure shape using Computed Tomography (CT) or Magnetic Resonance Imaging (MRI) of a knee joint part of a subject;

performing stress analysis with respect to the internal anatomical structure shape of the knee joint part, wherein performing the stress analysis includes: dividing the internal anatomical structure shape into meshes, producing a rigidity matrix based on Young's modulus and Poisson's ratio specific to designated materials with respect to each mesh, generating a weight vector applied to a site surface under designated border conditions, calculating a stress vector accumulated at each element based on the weight vector and a displacement vector of each element obtained by solving the rigidity matrix, and constructing the digital knee joint model in which an equal stress distribution is reflected in the internal anatomical structure shape of the knee joint part by generating contour lines of the stress distribution by connecting equal points with reference to the stress vector;

predicting, by the processor, a transition state by continuously or step wisely simulating a transition state towards an orthotic direction for a symptom improvement of the knee joint part by recalculating the displacement vector and the stress vector so that a load imposed by a weight of the subject on the knee joint part causes a contact pressure force to be dispersed between a femur tip and a tibia tip to disperse concentrated stresses with reference to the constructed digital knee joint model;

designing, by the processor, an exoskeleton mold by continuously or step wisely finely adjusting the knee joint part towards the orthotic direction on a basis of the predicted transition state by generating graphic data drawing a contour diagram of stress distribution based on coordinate values of each mesh and the stress vectors and always retaining the internal anatomical structure shape of the knee joint part with a constant pressure to create a stable environment suited for cell regeneration; and transmitting the design data representing the designed exoskeleton mold to external equipment for manufacturing the knee joint orthotic device.

8. The knee joint orthotic device according to claim 7, wherein the processor predicts the transition state by further simulating the transition state towards the orthotic direction of the constructed digital knee joint model so that the outline shape and the internal anatomical structure shape of the knee joint part changes their shapes smoothly from a current start state to the subject's ideal healthy state.

9. The knee joint orthotic device according to claim 7, further comprising:
a thigh fixing unit configured to be closely attached and fastened to a lower thigh part of the subject;
a shin fixing unit configured to be secured to an upper shin part of the subject;
a hinge unit comprising a rigid member with one end secured to the thigh fixing unit and its other end secured to the shin fixing unit that couples the thigh fixing unit and the shin fixing unit together and pivotally supports the knee joint part of the subject in a manner freely rotatable in a bending direction and an extending direction; and
an adjustment mechanism including a lock mechanism for engaging the hinge unit clockwise and counterclockwise, respectively, at desired angles around its rotation axis according to an external operation and an unlock mechanism for releasing an engaged state capable of adjusting a rotation angle of the hinge unit.

10. The knee joint orthotic device according to claim 9, further comprising:
a pressure sensor comprising at least one of: a MEMS pressure sensor, a capacitance-type pressure sensor, or a semiconductor-type pressure sensor that is attached to the knee joint orthotic device and that detects a pressure applied to an external force acting point of the knee joint part of the subject wearing the knee joint orthotic device; and
a state-maintaining detection unit configured to detect an adjustment amount so that the transition state towards the orthotic direction will be maintained within a specified reference range by returning any displacement to the orthotic direction when the displacement is caused by external pressure in a direction different from the orthotic direction of the knee joint part that is attached to the knee joint orthotic device and detects an adjustment amount of the knee joint orthotic device so that the transition state towards the orthotic direction of the knee joint part will be maintained within a specified reference range on the basis of a result of the detection by the pressure sensor.

11. The knee joint orthotic device according to claim 10, wherein the adjustment mechanism includes an actuator drive mechanism and automatically adjusts the rotation angle of the hinge unit according to the adjustment amount detected by the state-maintaining adjustment unit.

\* \* \* \* \*